(12) United States Patent
Weichert et al.

(10) Patent No.: US 7,144,832 B2
(45) Date of Patent: Dec. 5, 2006

(54) USE OF A MAGNESIA ZIRCONIA BRICK

(75) Inventors: Thomas Weichert, Bad Schwalbach (DE); Bernhard Schmalenbach, Wiesbaden (DE); Martin Geith, Knittelfeld (AT); Christian Majcenovic, Judendorf-Strassengel (AT)

(73) Assignee: Refractory Intellectual Property GmbH & Co. KG, Vienna (AU)

( * ) Notice: Subject to any disclaimer, the term of this patent is extended or adjusted under 35 U.S.C. 154(b) by 9 days.

(21) Appl. No.: 10/511,331

(22) PCT Filed: Mar. 6, 2003

(86) PCT No.: PCT/EP03/02270

§ 371 (c)(1), (2), (4) Date: Oct. 15, 2004

(87) PCT Pub. No.: WO03/087011

PCT Pub. Date: Oct. 23, 2003

(65) Prior Publication Data

US 2005/0164866 A1  Jul. 28, 2005

(30) Foreign Application Priority Data

Apr. 17, 2002 (DE) .............................. 102 16 879

(51) Int. Cl.
*C04B 35/04* (2006.01)
*C03B 5/237* (2006.01)

(52) U.S. Cl. ...................... 501/10; 501/108; 65/374.13
(58) Field of Classification Search ................ 501/104, 501/108; 65/374.13
See application file for complete search history.

(56) References Cited

U.S. PATENT DOCUMENTS

| 3,192,059 | A | * | 6/1965 | Good et al. .................. 501/106 |
| 3,416,938 | A | * | 12/1968 | Alper et al. ................. 501/104 |
| 3,528,830 | A | * | 9/1970 | Davies ........................ 501/106 |
| 4,451,516 | A | | 5/1984 | Kato |
| 6,509,287 | B1 | | 1/2003 | Boussant-Roux et al. |

FOREIGN PATENT DOCUMENTS

| BR | 9103769 | 3/1993 |
| GB | 937856 | 9/1963 |
| JP | 11310469 | 11/1999 |

OTHER PUBLICATIONS

Gerald Routschka, "Taschenbuch Feuerfeste Werkstoffe [Handbood of Fireproof Materials]", 1996, p. 169, Vulkan-Verlag Essen, ISBN 3-8027-3146-8.

* cited by examiner

*Primary Examiner*—Karl Group
(74) *Attorney, Agent, or Firm*—Christopher L. Parmelee; Walker & Jocke LPA

(57) ABSTRACT

The present invention relates to the use of a magnesia-zirconia brick in regenerator chambers of glass troughs, which are at least partially operated using a reducing atmosphere.

6 Claims, No Drawings

USE OF A MAGNESIA ZIRCONIA BRICK

Fireproof materials and products may be divided roughly into basic and non-basic products.

The group of basic (fired) products includes magnesia-zirconia products (referred to in the following as MZA) and products based on magnesia-zircon (referred to in the following as MZ).

MZA products are typically manufactured on the basis of sintered and/or fused magnesia and zirconium dioxide ($ZrO_2$). Mineralogically, they include periclase (MgO) and stabilized or non-stabilized zirconium dioxide, and they frequently contain, sometimes in small amounts, calcium zirconate, as well as small quantities of silicate phases.

If the zirconium dioxide is partially or completely stabilized, a direct bond $MgO$—$ZrO_2$ is produced through diffusion procedures. The mechanical heat properties are improved in this way.

MZA bricks have a high spalling resistance and a high refractability. They are therefore used above all in rotary tubular kilns or shaft kilns in which lime, dolomite, magnesite, or cement are calcined.

A typical batch for MZ products contains sintered and/or fused magnesia and zirconium silicate ($ZrO_2 \times SiO_2$). The zirconium silicate reacts with the MgO to form forsterite and stabilized zirconium dioxide. Typically not the entire MgO component is converted into forsterite. Therefore, mineralogical periclase components remain in the brick. Because of their good chemical resistance, above all to alkalis, alkalis salts, and/or $SO_2/SO_3$, MZ products are used in regenerator chambers of glass melting furnaces.

This related art and exemplary formulas of MZA/MZ products may be found in the "Taschenbuch feuerfeste Werkstoffe [Handbook of Fireproof Materials]" by Gerald Routschka: (ISBN 3-8027-3146-8).

The present invention is directed to the magnesia-zirconia products known per se, but uses them in a regenerator chamber of a glass melting furnace which is operated at least temporarily or periodically with a reducing atmosphere.

As noted in the introduction and cited in Routschka, until now magnesia-zircon products have been used in the packing of glass melting troughs, particularly in the alkali sulfate condensation region of such a packing. The temperature in this region is from 800 to 1100° C.

In order to reduce the $NO_x$ content in the exhaust gas, it has been suggested that a glass melting trough be operated with a reducing atmosphere. The $NO_x$ content in the exhaust gas may be reduced by factor of 3 to 6 in this case.

It is disadvantageous that reducing "skeins" arise in the regenerator chambers on the exhaust side, which negatively influence the service life of the magnesia-zircon bricks. At least partial decomposition of the forsterite ($Mg_2SiO_4$) in the material into sodium/magnesium silicates occurs. The CaO-containing silicate phases are also converted. As a result, the packing no longer has the required stability.

Surprisingly, it has now been determined that problems of this type may be avoided if, instead of the known MZ products recommended for regenerator chambers of glass troughs, those based on magnesia-zirconia (MZA) are used.

The decisive advantage is suspected to be that these products have a significantly lower proportion of silicates than the MZ products, so that the destruction of the microstructure described above does not occur or occurs to a significantly reduced extent.

$ZrO_2$ is extremely corrosion-resistant to the corrosive materials in the condensation region of the alkalis, even if the glass melting tank is operated with a reducing atmosphere and a reducing atmosphere accordingly reaches the regenerator chambers. This is also analogously true if the glass melting tank is only temporarily operated with a reducing atmosphere.

For the use claimed, the thermal conductivity (WLF) of the bricks (packing bricks) is an important parameter, as is the specific heat capacity (C) or volume-related heat capacity (product of specific heat capacity C and apparent density R). In addition, the ratio of thermal conductivity to the specific or volume-related heat capacity is of interest.

Good values are achieved for all parameters using the MZA products cited, i.e.:

the high thermal conductivity ensures the desired rapid passage of the heat through the brick, a specific heat capacity which is approximately 50% higher than zirconia bricks, for example, allows more heat to be stored, a favorite/more rapid temperature equalization is made possible through a higher value of the thermal diffusivity (over 1 $m^2$/sec.).

MZA products also have significant advantages in relation to $C_2S$-bonded magnesia bricks. The periclase and the CaO in the dicalcium silicate phase of the $D_2S$ products are converted by $SO_3$ in the exhaust gas into sulfates or sulfides, respectively. This again results in destruction of the brick microstructure.

The lower the $SiO_2$ content (the silicate phase), the more favorable the properties of the brick are for the application cited. The $SiO_2$ content is thus to be less than 1.0 weight-percent, and according to another embodiment it is to be less than 0.5 weight-percent (in relation to the total batch and/or the total molded part).

The CaO content (CaO able to be provided as calcium zirconate, for example) is below 2 weight-percent according to one embodiment.

The mineralogical composition of the MZA product may move within the known ranges (Routschka, op. cit.).

The product comprises 5 to 35 weight-percent $ZrO_2$, 65 to 95 weight-percent MgO, and at most 5 weight-percent other components.

According to one embodiment, the product contains at most 2% other components.

The open porosity, determined in accordance with DIN EN 993-Part 1, is to be between 11 and 15 volume-percent, or between 12 and 14 volume-percent according to one embodiment.

After firing above 1700° C., an apparent density between 3.20 and 3.55 $g/cm^3$, or between 3.25 and 3.40 $g/cm^3$ according to one embodiment, may be achieved. In this case, the apparent density is determined in accordance with DIN EN 993-Part 1.

The cold compression strength, determined in accordance with DIN EN 993-Part 5 on the fired product, is between 50 and 150 $N/mm^2$, or between 70 and 85 $N/mm^2$ according to one embodiment.

The thermal conductivity (determined according to "class", among other things, in Ber. Dtsch. Keram. Ges. [Report of the German Ceramics Society] 34 (1957), 183–189) is in the range of 3–4 W/Km (at 1000° C.).

The material grain sizes of the batch are not subject to any restrictions in principle. The proportion of zirconium dioxide, which may be introduced through baddeleyite, as commercially produced zirconium dioxide (unstabilized, partially stabilized, or completely stabilized), is in the grain range <0.5 mm, for example, divided (approximately) in half between <0.1 mm and 0.1–0.5 mm, according to one embodiment.

The component of sintered magnesia or fused magnesia is used in the grain range up to 6 mm according to one embodiment. In this case, the component >1 mm may make up half to two-thirds of the total magnesia charge. In the following, two formulas/batches are specified, including the property features achieved after firing.

The bricks thus manufactured were successfully tested in an engineering experiment which stimulated the conditions occurring in operation of a packing (of a glass melting trough). The bricks were particularly tested under reducing atmosphere and showed themselves to be superior to conventional magnesia-zircon bricks.

|  | Sample 1 | Sample 2 |
| --- | --- | --- |
| Magnesia (MgO) <1 mm | 30% | 20% |
| Magnesia (MgO) 1–6 mm | 50% | 50% |
| $ZrO_2$ 0.1 to 0.5 mm | 0 | 15 |
| $ZrO_2$ < 0.1 mm | 20 | 15 |
| Green apparent density (g/cm$^3$) | 3.32 | 3.46 |
| Firing (° C.) | 1750 | 1750 |
| Apparent density after firing (g/cm$^3$) | 3.35 | 3.50 |
| Open porosity (%) | 12.5 | 14 |
| Cold compression strength (N/mm$^2$) | 55 | 80 |

What is claimed is:

1. A process comprising:
   (a) installing a regenerator chamber of a glass melting furnace with a plurality of magnesia-zirconia bricks comprising 5 to 35 weight-percent $ZrO_2$, 65 to 95 weight-percent MgO, less than 1.0 weight-percent $SiO_2$, and at most 5 weight-percent other components; and
   (b) at least partially operating the regenerator chamber of the glass melting furnace using a reducing atmosphere.

2. The process according to claim 1, wherein the bricks have a CaO content <2.0 weight-percent.

3. The process according to claim 1, wherein the bricks contain at most 2% of the other components.

4. The process according to claim 1, wherein an open porosity of the bricks is 11 to 15 volume-percent.

5. The process according to claim 1, wherein a apparent density of the bricks after firing is 3.20 to 3.60 g/cm$^3$.

6. The process according to claim 1, wherein a cold compression strength of the bricks after firing is 50 to 150 N/mm$^2$.

* * * * *